3,092,624
STEROL AND PIPERAZINE COMPLEXES AND PROCESS FOR THE PREPARATION THEREOF

Charles D. Robeson, Rochester, N.Y., assignor to Eastman Kodak Company, Rochester, N.Y., a corporation of New Jersey
No Drawing. Filed Apr. 26, 1962, Ser. No. 190,248
19 Claims. (Cl. 260—239.5)

This invention relates to the chemical arts. More particularly, it relates to that part of organic chemistry having to do with sterols.

Sterols are complex, organic chemical compounds, the molecules of which are represented by the following general formula:

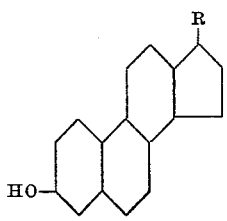

wherein R is a hydrocarbon radical containing at least 6 carbon atoms. Sterols occur in nature in both plants and animals, being generally found in the oils and fats obtained therefrom. Sterols of animal origin are referred to generally as zoosterols while sterols of plant origin are referred to generally as phytosterols. Examples of zoosterols are cholesterol, β-cholestanol and coprosterol. Examples of phytosterols are stigmasterol, β-sitosterol and ergosterol.

Sterols generally are useful as starting materials in the preparation and synthesis of adrenal cortical hormones and sex hormones. As a result, processes for removing sterols from animal and vegetable fats and oils containing them and especially processes for separating sterols from other fat and oil components (for example, vitamin A, tocopherols and the like) which are removed along with sterols from fats and oils, are of importance.

Moreover, because sterols of natural origin are somewhat abundant, new products derived from sterols and having useful properties are of interest.

This invention is based on the discovery that, in the absence of water, sterols in general react with piperazine compounds selected from the group consisting of piperazine and C-methyl and C-ethyl substituted piperazines to form crystallizable complexes. These complexes constitute a new class of compounds which are generically referred to herein as the piperazine compound complexes of sterols.

This invention in one aspect comprises these piperazine compound complexes of sterols. In general, the molecular equivalent ratio of the piperazine compound to the sterol in each complex is 1:2. The general molecular formula for these complexes is:

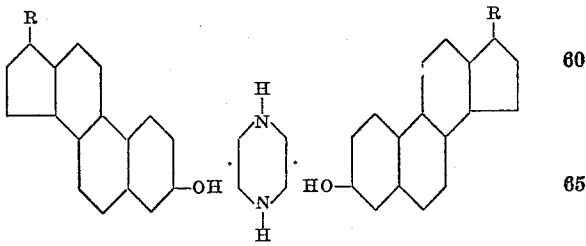

wherein each R is a hydrocarbon radical containing at least about 6 carbon atoms. The complexes of this invention at 20° C. are generally solid, and while in the solid state are generally crystalline. As a class, they have melting points which generally are higher than the melting points of the sterols from which they are derived. In general, at 20° C. they are highly insoluble in the usual, anhydrous, organic solvents. Indeed, these complexes in general are substantially less soluble at 20° C. in the usual, anhydrous, organic solvents than the parent sterols. Moreover, the piperazine complexes of sterols are generally less soluble at 20° C. in the usual, anhydrous, organic solvents than many of the known complexes of sterols and such compounds as digitonin, urea, oximes, oxalic acid and the like. As a class the piperazine compound complexes of sterols are generally non-hygroscopic. Another interesting and useful property of these complexes is that upon admixture with water they decompose in each case to the parent piperazine compound and sterol.

The piperazine compound complexes of streols in general have anthelmintic activity. Hence, the complexes of this invention have utility in veterinary medicine. Because of their non-hygroscopic nature, these complexes upon comminution provide a stable, free-flowing powder useful in this form as an addition to animal and poultry feeds for control of worms and the like. Moreover, because of their non-hygroscopic nature, the complexes of this invention can be readily tableted and thus be made into a physical form suitable for administration in massive dosages in, for example, animal and poultry feeds. In this regard, it should be observed that piperazine and its citrate, adipate and tartrate salts, which are known anthelmintics, are so hygroscopic that it is customary o administer them to animals and poultry by way of their drinking water. It is more difficult to control the amount of medication by this mode of administration than by administration by way of the feed.

This invention in another aspect comprises a process for making the piperazine compound complexes of sterols. This process broadly comprises admixing in the absence of water a sterol and at least one piperazine compound selected from the group consisting of piperazine and C-methyl and C-ethyl substituted piperazines, preferably at a mole ratio of sterol to piperazine compound of about 2:1. The expression "C-methyl and C-ethyl substituted piperazines" refers to piperazines having in their molecules the methyl and ethyl substituents attached only to nuclear carbon atoms and not to nuclear nitrogen atoms. Typical examples of a piperazine compound are:

Piperazine
2-methylpiperazine
Trans-2,5-dimethylpiperazine
Cis-2,5-dimethylpiperazine
2,3,5-trimethylpiperazine
2,3,5,6-tetramethylpiperazine Other examples of a piperazine compound include C-ethyl substituted piperazines such as 2-ethylpiperazine, and C-methyl, C-ethyl substituted piperazines such as 2,5-dimethyl-3,6-dimethylpiperazine. Typical examples of a sterol are:

Cholesterol
β-Sitosterol
Stigmasterol
Cholestanol
Ergosterol
Ergostanetriol
Ergostadientriol
Epicholestranol
Coprostanol
Suprasterols
7-dehydrocholesterol
22-dihydroergosterol
Agnosterol
Lanosterol
Lumisterol In preferred embodiments of this process of this invention, admixing of the sterol and piperazine compound takes place in a substantially anhydrous liquid medium which, at the temperature of admixture and at the crystallization temperature, is chemically inert relative to the piperazine compound, the sterol and the resulting complex. It is preferred that the substantially anhydrous liquid medium be one in which the complex is at least practically insoluble and yet one in which the piperazine compound and sterol are at least somewhat soluble. An example of such a liquid medium is acetone. Other suitable organic solvents include benzene, toluene, dimethoxyethane, acetonitrile, dimethylformamide, mixtures of these solvents and the like. Generally, organic solvents such as lower aliphatic alcohols (alcohols having less than about 8 carbon atoms and including both monohydric and polyhydric alcohols) are to be avoided since the desired reaction does not take place therein; these solvents are apparently not inert.

In specific embodiments of this process of this invention, the piperazine complex of a sterol, which is formed in the anhydrous liquid medium at admixing temperature, usually precipitates or crystallizes to some extent at that temperature, depending, of course, upon the temperature, quantity of the complex, and quantity of the liquid medium. For maximum crystallization, however, it is generally preferred to change the temperature of the liquid medium, after admixture has taken place, to a temperature at which the complex is even less soluble in the liquid medium. Then, after the desired extent of crystallization has occurred, the crystallized complex is removed from the liquid medium. Such removal is by conventional ways such as, for example, filtration, decantation, centrifugation and the like. In these embodiments of this process of this invention a typical, preferred, admixing temperature is 50° C. and a typical, preferred, crystallization temperature is 20° C. However, higher and lower admixing temperatures and higher and lower crystallization temperatures can be employed. In the case of acetone as the liquid medium in which admixing and crystallization take place, a practical range of admixing temperatures is from about 20 to about 55° C. while a practical range of crystallization temperatures is from about 0 to about 20° C.

This invention in another aspect comprises a process for separating a sterol from a mixture consisting essentially of the sterol and a fatty or oily compound such as, for example, a tocopherol. This process is particularly useful in the purification of one or more sterols derived from natural sources. It is also particularly useful in the purification of one or more tocopherols derived from natural sources. In this regard, phytosterols and tocopherals are frequently found together in vegetable oils and the like. Processes which have been developed for removing tocopherols and sterols from vegetable oils and the like usually result in concentrates of these compounds, which contain other compounds such as glycerides, hydrocarbons and the like. This process of this invention is useful for separating sterols from such concentrates.

In this aspect of the invention, separation of a sterol from a mixture comprising the sterol and a fatty or oily compound such as, for example, a tocopherol and the like is effected by (1) admixing in the absence of a significant concentration of water, but in a liquid medium of the aforementioned kind in which the fatty or oily compound is soluble, the mixture with at least one piperazine compound selected from the group consisting of piperazine and C-methyl and C-ethyl substituted piperazines, the mole ratio of the piperazine compound to the sterol being preferably at least about 1:2, and (2) removing the resulting piperazine compound complex of the sterol from the liquid medium. In specific embodiments of this process, this latter step is performed by cooling the liquid medium to a temperature at which a substantial proportion of the piperazine compound complex of the sterol crystallizes and separating, for example, by filtration, after a substantial proportion of the piperazine compound complex of the sterol has crystallized, the crystallized product from the liquid medium. In those instances where the sterol rather than the complex is desired as the end product, the crystallized product thus obtained is admixed with water, whereupon decomposition of the complex takes place and the sterol and piperazine compounds are released from one another. Usually it is preferred to wash the thus-released sterol with water to remove the released piperazine compound and then dry the thus-purified sterol. It should be noted that tocopherols and piperazine compounds form crystalline complexes. However, these complexes have far greater solubilities in the liquid medium than the piperazine compound complexes of sterols. Hence, when treating according to this process a tocopherol concentrate containing a sterol, during the practice of the first two steps substantially all of the piperazine compound complex of the sterol rapidly crystallizes out of solution before any significant crystallization of the piperazine compound complex of the tocopherol takes place. By removing this initial crop of crystals before any significant crystallization of the piperazine compound complex of the tocopherol takes place, separation of the sterol from the tocopherol is thereby effected.

This invention is further illustrated by the following examples of various aspects thereof, including specific embodiments. This invention is not limited to these specific embodiments unless otherwise indicated.

EXAMPLE 1

This example illustrates the preparation of a piperazine compound complex of campesterol.

1 gram (0.0025 mole) of campesterol (a typical melting point of this compound is 154.5–155.5° C.) is dissolved in 75 milliliters of acetone. Typically, on storage of the resulting solution at 20° C., no crystals are formed therein. To the campesterol solution there is admixed a solution of 0.2 gram (0.0023 mole) of piperazine and 10 milliliters of acetone. The temperature of the resulting solution is reduced to 0° C. and the solution is maintained at this temperature for 24 hours. During this period of time a crop of crystals forms in the solution. The crystals are removed by filtration from the solution, washed in cold acetone and the residual acetone removed by evaporation. The dry, crystalline solids are the piperazine complex of campesterol, the mole ratio of piperazine to campesterol being 1:2. A typical melting point of the complex is 155–157° C. A typical yield of the crystals is 0.6 gram (0.0007 mole).

EXAMPLE 2

This example illustrates the preparation of a piperazine compound complex of cholesterol.

A cholesterol solution is prepared by dissolving 1 gram (0.0026 mole) of cholesterol (a typical melting point is 136–138° C.) in 50 milliliters of acetone. A solution of piperazine is prepared by dissolving 0.2 gram (0.0023 mole) of piperazine in 5 milliliters of acetone. The two solutions are admixed at 20° C. The temperature of the resulting solution is reduced to 5° C. and the solution is maintained at this temperature for 24 hours. During this period of time a crop of crystals forms in the solution. The crystals are removed by filtration from the solution, washed in cold acetone and the residual acetone removed by evaporation. The dried solids are the piperazine complex of cholesterol. A typical melting point of the solids is 144–146.5° C. A typical yield of the solids is 0.6 gram (0.0007 mole).

EXAMPLE 3

This example illustrates the preparation of the piperazine compound complexes of the sterols normally found in soybean oil.

A warm solution of mixed, soybean oil sterols is prepared by dissolving 4.5 grams of typical soybean oil sterols (a mixture of about 24 percent by weight of stigmasterol, 70 percent by weight of $\beta$- and $\alpha$-sitosterol and campesterol and 6 percent by weight of long-chain hydrocarbons) in 200 milliliters of acetone at 50° C. The solution is divided into two equal portions.

To one portion of the sterols solution is added 10 milliliters of acetone. On cooling of the resulting solution to 20° C. no precipitation of solids is typically observed.

To the other portion of the sterols solution there is added a solution of 0.4 gram of piperazine in 10 milliliters of acetone at 50° C. The resulting solution is cooled to 20° C. Thereupon a white, crystalline precipitate is formed in the resulting solution. The crystalline solids are removed from the solution by filtration, washed in cold acetone and residual acetone removed by evaporation. These solids are the piperazine complexes of the various sterols present in the initial mixture of sterols. A typical melting point is 148–152° C. A typical yield of the solids is 1.3 grams.

When the solids are dissolved in ether, the resulting ether solution washed with water to thereby decompose the complexes and remove the released piperazine, the ether evaporated, and the residue crystallized from acetone, a crop of mixed soybean oil sterols is recovered. A typical melting point of the mixture of sterols is 139–141° C.

EXAMPLE 4

This example illustrates the preparation of complexes of 2-methylpiperazine and soybean oil sterols.

To a hot (50° C.) solution of 3 grams of mixed soybean oil sterols (a mixture comprising about 24 percent by weight stigmasterol, 70 percent by weight $\beta$- and $\alpha$-sitosterol and campesterol and about 6 percent by weight long-chain hydrocarbons) in 100 milliliters of hexane is added a solution of 1.5 grams of 2-methyl piperazine in 40 milliliters of hexane. Typically, crystallization occurs almost immediately after the addition of the two solutions. The temperature of the resulting solution is lowered to 20° C. and the solution is maintained at this temperature for 2 hours. Thereafter, the crystalline precipitate is separated from the solution as by filtration and residual solvent is removed by evaporation. The resulting product is a white crystalline solid having a typical melting point of 146–148° C. A typical yield of the solids is 2.0 grams. These solids are the 2-methylpiperazine complexes of the various sterols present in the sterol mixture.

EXAMPLE 5

This example illustrates the preparation of the complexes of cis-2,5-dimethylpiperazine and soybean oil sterols.

To a solution of 3 grams of mixed soybean oil sterols (a mixture of phytosterols comprising about 24 percent by weight of stigmasterol, 70 percent by weight of $\beta$- and $\alpha$-sitosterol and campesterol and 6 percent by weight of long-chain hydrocarbons) in 100 milliliters of hexane is admixed a solution of 0.6 milliliter (0.55 gram) of cis-2,5-dimethylpiperazine in 10 milliliters of hexane. The admixture of the solutions takes place at a temperature of about 20° C. The resulting solution is maintained at this temperature for about 2 hours. During this time a crystalline precipitate slowly forms. At the end of this time the precipitate is removed by filtration from the solution and residual solution is removed therefrom by evaporation under vacuum. The resulting solids are the cis-2,5-dimethylpiperazine complexes of the various sterols present in the initial sterols mixture. A typical melting point of the solids is 138.5–141° C. A typical yield is 1.9 grams.

EXAMPLE 6

This example illustrates the preparation of the complexes of trans-2,5-dimethylpiperazine and soybean oil sterols.

To a solution of mixed soybean oil sterols (a mixture consisting essentially of about 24 percent by weight stigmasterol, 70 percent by weight of $\beta$- and $\alpha$-sitosterol and campesterol and 6 percent by weight of long-chain hydrocarbons) at a concentration of 2 grams in 200 milliliters of hexane is added a solution composed of 0.4 gram of trans-2,5-dimethylpiperazine in 5 milliliters of acetone. Typically, there is immediate formation of a crystalline precipitate. The precipitate is filtered off from the solution after 2 hours at 20° C. The solids are the trans-2,5-dimethylpiperazine complexes of the sterols present in the initial mixture. A typical melting point of the solids is 163–165° C. A typical yield of the solids after removal of residual solvent therefrom is 1.65 grams.

EXAMPLE 7

This example illustrates on a comparative basis the solubility of piperazine compound complexes of sterols and the solubilities of other, known, crystallizable, sterol complexes.

A solution of mixed soybean oil sterols (a mixture comprising about 24 percent by weight of stigmasterol, 70 percent by weight of $\beta$- and $\alpha$-sitosterol and campesterol and 6 percent by weight of long-chain hydrocarbons) is prepared by admixing at about 50° C. 10 grams of such a mixture and 500 milliliters of acetone. The solution is then separated into five equal aliquot portions (100 milliliter portions). These portions are then treated as follows:

A first portion is established and maintained as a control. Consequently, nothing is added to it.

To a second portion is added a solution of 0.2 gram of piperazine in 5 milliliters of acetone.

To a third portion is added a solution of 0.2 gram of acetone oxime in 5 milliliters of acetone.

To a fourth portion is added a solution of 0.2 gram of urea in 5 milliliters of acetone.

To the fifth portion is added a solution of 0.2 gram of oxalic acid in 5 milliliters of acetone.

The temperature of each portion is lowered to 20° C. and each portion is held at this temperature for 24 hours.

During this period of time it is typical that the second portion treated with the piperazine solution has almost immediate precipitation of crystalline solids. A typical yield of crystalline solids from the second portion treated with piperazine is 0.95 gram. Typically, the only other portion which yields a crystalline product on standing is that treated with urea. However, the yield of crystalline solids at the end of the period of crystallization is typically only about 0.5 gram, approximately half the yield obtained in using piperazine as the complexing agent.

EXAMPLE 8

This example illustrates organic solvents other than acetone, which can be employed as the liquid medium in which the admixing of the piperazine compound and the sterol take place. This example also illustrates the effect obtained in employing a lower aliphatic alcohol as the liquid medium.

Solutions of soybean oil sterols in various organic solvents are prepared by dissolving in each case at 20° C. 5 grams of mixed soybean oil sterols (a mixture of sterols, which comprises about 24 percent by weight of stigmasterol, 70 percent by weight of $\beta$- and $\alpha$-sitosterol and campesterol and 6 percent by weight of long-chain hydrocarbons) in the various solvents at the indicated volumes listed in the following Table I. To each solution is added 0.5 gram of piperazine. The resulting mixture in each case is warmed to effect solution of the piperazine. In each case, the temperature of the resulting solution is then reduced to 20° C. In each solution thus treated a crystalline precipitate is thereby formed. In each case the crystalline precipitate is removed from the solution by filtration and residual solvent removed from the filter cake by evaporation. Typical results are set forth in the following Table I.

Table I

| Organic Solvent | Volume, ml. | Weight of Precipitate | Melting Point, °C. |
| --- | --- | --- | --- |
| Hexane | 100 | 4.8 | 148–152 |
| Ethyl acetate | 75 | 4.1 | 150–152 |
| Isopropyl ether | 75 | 4.0 | 150–152 |
| Ethyl alcohol | 50 | 2.7 | 136–138 |

Thus, it is typical that the piperazine complex forms in good yields in such solvents as hexane, ethyl acetate, and isopropyl ether, but does not form in such solvents as ethyl alcohol. In the latter instance, as indicated by melting point, the precipitate consists of the free sterols rather than the piperazine compound complex of the sterols. Results similar to that obtained with ethyl alcohol are obtained with methyl alcohol, isopropyl alcohol and tert. butyl alcohol.

EXAMPLE 9

This example illustrates the purification of a d-α-tocopherol concentrate containing sterols.

A d-α-tocopherol concentrate containing sterols is prepared at 20° C. by admixing 0.3 gram of soybean oil sterols (a mixture comprising about 24 percent by weight of stigmasterol, 70 percent by weight of β- and α-sitosterol and campesterol and 6 percent by weight of long-chain hydrocarbons) with 6.6 grams of pure d-α-tocopherol, an oil. The resulting mixture is dissolved at 20° C. in 20 milliliters of acetone, giving a concentrate solution.

0.69 gram of piperazine is dissolved at 20° C. in 5 milliliters of acetone, giving a piperazine solution.

The piperazine solution is admixed at 20° C. with the concentrate solution. The temperature of the resulting solution is lowered to 0° C. and maintained thereat for 1 hour.

During this period of time, a precipitate of solids forms in the solution. The solids are removed from the solution by filtration, washed with cold acetone and residual acetone removed therefrom by evaporation. These solids are the piperazine complexes of the sterols. A typical melting point of the solids is 147–152° C. A typical yield of the solids under these conditions is 0.29 gram, which indicates that substantially all of the sterols have been removed from the solution. These solids are washed with water whereupon the complexes are decomposed to give the free sterols.

The solution after filtration of the solids therefrom is maintained at 0° C. for 24 hours. During this period of time another precipitate of solids formed. The solids are removed from the mother liquor by filtration, washed with cold acetone and residual acetone removed therefrom by evaporation. These solids are the piperazine complex of d-α-tocopherol. A typical melting point of the solids thus obtained is 52–54° C. A typical yield of the solids is 3.5 grams. These solids are washed with water whereupon the piperazine complex of d-α-tocopherol is decomposed to give a d-α-tocopherol product substantially free of sterols.

EXAMPLE 10

This example is a further illustration of the separation of sterols from a tocopherol concentrate.

To a solution of 30 grams of a tocopherol concentrate (28.5 percent by weight total tocopherol) and 250 milliliters of hexane is added at 20° C. a solution of 2 grams of piperazine in 50 milliliters of hexane. Almost immediately upon addition of the piperazine solution, crystallization of the piperazine compound complexes of the sterols present in the concentrate commences. The solution is maintained at 20° C. for about 2 hours and then the temperature is lowered to 0° C. The solution is maintained at this temperature for 2 more hours. Thereafter, the solution is filtered to obtain the crystalline complexes. A typical yield of the complexes on a solvent-free basis is 8.7 grams. The crystalline solids are dissolved in chloroform and ether and the resulting solution washed three times with water. The resulting solids are then dried. A typical infrared assay of the solids indicates they are sterols at a purity of about 98 percent. A typical yield of the sterols under these conditions is 7.95 grams.

Thus, there are provided crystalline complexes of sterols and piperazines. In addition, there is provided a process for making a crystalline complex of a piperazine compound and a sterol. Moreover, a process is provided for separating one or more sterols from a mixture of compounds such as, for example, a mixture of a sterol and a tocopherol.

Other advantages, benefits and embodiments will be apparent to those in the exercise of ordinary skill in the art after reading the foregoing disclosure. In this regard, while this invention has been described in considerable detail relative to certain specific embodiments thereof, variations and modifications of these embodiments can be effected within the spirit and scope of the invention as disclosed and claimed.

The embodiments of this invention in which an exclusive property or privilege is claimed are defined as follows:

1. A complex of a sterol and a piperazine compound selected from the group consisting of piperazine and C-methyl and C-ethyl substituted piperazines.

2. A complex of cholesterol and piperazine.

3. A complex of a phytosterol and piperazine.

4. A complex of campesterol and piperazine.

5. A complex of a phytosterol and 2-methyl-piperazine.

6. A complex of a phytosterol and trans-2,5-dimethyl-piperazine.

7. A complex of a phytosterol and cis-2,5-dimethyl-piperazine.

8. A process for making a complex of a sterol and a piperazine compound selected from the group consisting of piperazine and C-methyl and C-ethyl substituted piperazines, which comprises: admixing under substantially anhydrous conditions said sterol and said piperazine compound.

9. A process for making a complex of a sterol and a piperazine compound selected from the group consisting of piperazine and C-methyl and C-ethyl substituted piperazines, which comprises: admixing under substantially anhydrous conditions said sterol and said piperazine compound at a mole ratio of said piperazine compound to said sterol of at least about 1:2, said admixing being in an inert liquid medium in which said sterol and said piperazine compound are soluble, whereby said complex is formed; and removing said complex from said liquid medium.

10. A process for making a complex of a sterol and a piperazine compound selected from the group consisting of piperazine and C-methyl and C-ethyl substituted piperazines, which comprises: admixing under substantially anhydrous conditions said sterol and said piperazine compound at a mole ratio of said piperazine compound to said sterol of at least about 1:2, said admixing being in an inert liquid medium in which said sterol and said piperazine compound are soluble, whereby said complex is formed; lowering the temperature of said liquid medium to a temperature at which the solubility therein of said complex is substantially less, whereby crystals of said complex are formed; and separating said crystals from said liquid medium.

11. A process for making a complex of cholesterol and piperazine which comprises: admixing under substantially anhydrous conditions in acetone said cholesterol and piperazine at a mole ratio of said piperazine to said cholesterol of at least about 1:2, whereby said complex is formed; lowering the temperature of said acetone to about 0° C., whereby crystals of said complex are precipitated; and separating said crystals from said acetone.

12. A process for making a complex of a phytosterol and piperazine which comprises: admixing under substantially anhydrous conditions in acetone said phytosterol and piperazine at a mole ratio of said piperazine to said phytosterol of at least about 1:2, whereby said complex is formed; lowering the temperature of said acetone to about 0° C., whereby crystals of said complex are precipitated; and separating said crystals from said acetone.

13. A process for making a complex of campesterol and piperazine which comprises: admixing under substantially anhydrous conditions in acetone said campesterol and piperazine at a mole ratio of said piperazine to said campesterol of at least about 1:2, whereby said complex is formed; lowering the temperature of said acetone to about 0° C., whereby crystals of said complex are precipitated; and separating said crystals from said acetone.

14. A process for making a complex of a phytosterol and 2-methylpiperazine which comprises: admixing under substantially anhydrous conditions in acetone said phytosterol and 2-methylpiperazine at a mole ratio of said 2-methylpiperazine to said phytosterol of at least about 1:2, whereby said complex is formed; lowering the temperature of said acetone to about 0° C., whereby crystals of said complex are precipitated; and separating said crystals from said acetone.

15. A process for making a complex of a phytosterol and 2,5-dimethylpiperazine which comprises: admixing under substantially anhydrous conidtions in acetone said phytosterol and 2,5-dimethylpiperazine at a mole ratio of said 2,5-dimethylpiperazine to said phytosterol of at least about 1:2, whereby said complex is formed; lowering the temperature of said acetone to about 0° C., whereby crystals of said complex are precipitated; and separating said crystals from said acetone.

16. A process for making a complex of a phytosterol and cis-2,5-dimethylpiperazine which comprises: admixing under substantially anhydrous conditions in acetone said phytosterol and cis-2,5-dimethylpiperazine at a mole ratio of said cis-2,5-dimethylpiperazine to said phytosterol of at least about 1:2, whereby said complex is formed; lowering the temperature of said acetone to about 0° C., whereby crystals of said complex are precipitated; and separating said crystals from said acetone.

17. A process for separating a sterol from a mixture consisting essentially of said sterol and an oily compound, which comprises: admixing under substantially anhydrous conditions said mixture in an inert liquid medium in which said sterol and said oily compound are soluble and a piperazine compound selected from the group consisting of piperazine and C-methyl and C-ethyl substituted piperazines, whereby said sterol and said piperazine compound form a complex; removing said complex from said liquid medium; admixing said removed complex with water, whereby said complex is decomposed to said sterol and said piperazine compound; and separating said sterol from said water and said piperazine compound.

18. A process for separating a sterol from a mixture consisting essentially of said sterol and an oily compound which comprises: admixing under substantially anhydrous conditions said mixture in an inert liquid medium in which said sterol and said oily compound are soluble and a piperazine compound selected from the group consisting of piperazine and C-methyl and C-ethyl substituted piperazines, whereby said sterol and said piperazine compound form a complex; lowering the temperature of said liquid medium to a tempearture at which the solubility therein of said complex is substantially less, whereby crystals of said complex are formed; separating said crystals from said liquid medium; admixing said removed complex with water, whereby said complex is decomposed to said sterol and said piperazine compound; and separating said sterol from said water and said piperazine compound.

19. A process for separating a sterol from a mixture consisting essentially of said sterol and a tocopherol which comprises: admixing under substantially anhydrous conditions said mixture in an inert liquid medium in which said sterol and said tocopherol are soluble and a piperazine compound selected from the group consisting of piperazine and C-methyl and C-ethyl substituted piperazines, whereby said sterol and said piperazine compound form a complex; lowering the temperature of said liquid medium to a temperature at which the solubility therein of said complex is substantially less, whereby crystals of said complex are formed; separating said crystals from said liquid medium; admixing said removed complex with water, whereby said complex is decomposed to said sterol and said piperazine compound; and separating said sterol from said water and said piperazine compound.

No references cited.